United States Patent
Kim et al.

(10) Patent No.: US 9,900,053 B2
(45) Date of Patent: Feb. 20, 2018

(54) NFC CARD READER, SYSTEM INCLUDING NFC CARD READER, AND A METHOD OF OPERATING THE SAME

(71) Applicants: Jun Ho Kim, Yongin-si (KR); Hyun Jae Kang, Seoul (KR); Min Woo Lee, Seoul (KR); Hyoung Hwan Roh, Seoul (KR)

(72) Inventors: Jun Ho Kim, Yongin-si (KR); Hyun Jae Kang, Seoul (KR); Min Woo Lee, Seoul (KR); Hyoung Hwan Roh, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/881,797

(22) Filed: Oct. 13, 2015

(65) Prior Publication Data

US 2016/0105220 A1    Apr. 14, 2016

(30) Foreign Application Priority Data

Oct. 14, 2014 (KR) .................. 10-2014-0138161

(51) Int. Cl.
*H04B 5/00* (2006.01)

(52) U.S. Cl.
CPC ......... *H04B 5/0031* (2013.01); *H04B 5/0056* (2013.01)

(58) Field of Classification Search
CPC ........... H04B 5/00–5/02; H04W 4/008; G06K 19/0712; G06K 19/0715; G06K 19/0723; G06K 7/10128; G06K 7/10217
See application file for complete search history.

(56) References Cited

U.S. PATENT DOCUMENTS

| | | | |
|---|---|---|---|
| 5,418,353 A * | 5/1995 | Katayama | G06K 7/0008 235/375 |
| 5,703,573 A * | 12/1997 | Fujimoto | G01S 13/82 340/10.3 |
| 8,077,010 B2 | 12/2011 | Kato | |
| 8,559,903 B2 | 10/2013 | Pierick et al. | |
| 8,588,719 B1 * | 11/2013 | Mehrotra | H03G 3/3068 375/316 |

(Continued)

FOREIGN PATENT DOCUMENTS

| | | |
|---|---|---|
| JP | 2003-168083 A | 6/2003 |
| JP | 2008-129919 A | 6/2008 |

(Continued)

*Primary Examiner* — Gennadiy Tsvey
(74) *Attorney, Agent, or Firm* — Harness, Dickey & Pierce, P.L.C.

(57) ABSTRACT

A near-field communication (NFC) card reader may include a monitor configured to measure an amplitude of a magnetic field induced by an antenna; a gain controller configured to determine an amplification gain based on the measured amplitude of the magnetic field and output a gain control signal; a signal restoration unit configured to receive a carrier signal and a data signal that overlaps with the carrier signal via the antenna, and restore the data signal from the received signals; and a variable-gain amplifier configured to amplify the data signal restored by the signal restoration unit according to the gain control signal.

17 Claims, 13 Drawing Sheets

(56) References Cited

U.S. PATENT DOCUMENTS

| | | | | |
|---|---|---|---|---|
| 8,994,510 B2* | 3/2015 | Restiau | | G06K 7/00 340/10.1 |
| 2001/0015697 A1* | 8/2001 | Wuidart | | G06K 7/0008 340/8.1 |
| 2003/0006926 A1* | 1/2003 | Nikai | | H03M 1/18 341/161 |
| 2004/0256460 A1* | 12/2004 | Charrat | | G06K 7/0008 235/451 |
| 2005/0159913 A1* | 7/2005 | Ariyoshi | | G06K 7/10465 702/122 |
| 2006/0289649 A1* | 12/2006 | Sugiura | | G06K 7/0008 235/451 |
| 2007/0122941 A1* | 5/2007 | Ota | | G06K 7/0008 438/107 |
| 2008/0024280 A1* | 1/2008 | Kato | | G06K 7/0008 340/10.3 |
| 2008/0266060 A1* | 10/2008 | Takei | | G06K 7/0008 340/10.4 |
| 2009/0237251 A1* | 9/2009 | Kim | | G06K 7/0008 340/572.1 |
| 2009/0273454 A1* | 11/2009 | Onozuka | | G06K 7/0008 340/10.51 |
| 2010/0080270 A1* | 4/2010 | Chen | | H03F 1/223 375/219 |
| 2010/0237943 A1* | 9/2010 | Kim | | H03F 3/45475 330/254 |
| 2010/0328045 A1* | 12/2010 | Goto | | G06K 7/0008 340/10.4 |
| 2011/0102151 A1* | 5/2011 | Shin | | G06K 7/0008 340/10.1 |
| 2011/0149773 A1 | 6/2011 | Lee et al. | | |
| 2013/0203349 A1* | 8/2013 | Hillan | | H04B 5/02 455/41.1 |
| 2013/0222119 A1* | 8/2013 | Tietke | | G06K 7/0008 340/10.5 |
| 2013/0237150 A1 | 9/2013 | Royston | | |
| 2014/0129425 A1* | 5/2014 | Yang | | G06K 7/10158 705/39 |
| 2014/0139322 A1* | 5/2014 | Wang | | H04B 5/0031 340/10.5 |
| 2014/0227986 A1* | 8/2014 | Kanno | | H04B 5/0031 455/115.1 |
| 2014/0266627 A1* | 9/2014 | Padilla | | G06K 7/0008 340/10.1 |
| 2014/0370803 A1* | 12/2014 | Haverinen | | H04B 5/0031 455/41.1 |
| 2015/0079903 A1* | 3/2015 | Song | | G06K 7/10217 455/41.1 |
| 2015/0178525 A1* | 6/2015 | Lee | | G06K 7/10158 340/10.1 |

FOREIGN PATENT DOCUMENTS

| | | |
|---|---|---|
| JP | 2009-278389 A | 11/2009 |
| JP | 2012-019304 A | 1/2012 |
| JP | 2012-060610 A | 3/2012 |
| KR | 10-1204090 B1 | 11/2012 |
| KR | 10-2013-0053133 A | 5/2013 |

* cited by examiner

| CD | 00 | 01 | 10 | 11 |
|---|---|---|---|---|
| Gain | G10 | G11 | G12 | G13 |

NFC CARD READER, SYSTEM INCLUDING NFC CARD READER, AND A METHOD OF OPERATING THE SAME

CROSS-REFERENCE TO RELATED APPLICATION

This application claims the benefit of Korean Patent Application No. 10-2014-0138161, filed on Oct. 14, 2014, in the Korean Intellectual Property Office, the disclosure of which is incorporated herein in its entirety by reference.

BACKGROUND

One or more example embodiments of the inventive concepts relate to a non-contact type communication apparatus, a system and/or a method of operating the system. For example, at least some example embodiments relate to a card reader for communicating with a near-field communication (NFC) card, a system including the card reader, and/or a method of operating the card reader.

An NFC card reader may restore a signal component that overlaps with a magnetic field component of 13.56 MHz induced by an antenna, and may convert the restored signal to a digital signal. When the amplitude of the restored signal is low, the restored signal may not easily be converted into the digital signal, therefore, to amplify the restored signal to a level sufficient to convert the restored signal into a digital signal, the NFC card reader may amplify the restored signal before converting the restored signal.

When a distance between a card and the card reader is large, the card reader may need to use a high gain when performing signal amplification to restore a low-amplitude signal to a level sufficient to establish communication. In contrast, when the distance between the card and the card reader is small, the card reader may need to use a low gain so as to prevent a high-amplitude signal from being saturated.

SUMMARY

According to an example embodiment of the inventive concepts, a near-field communication (NFC) card reader for communicating with an NFC card includes a monitor configured to measure an amplitude of a magnetic field induced by an antenna; a gain controller configured to determine an amplification gain based on the measured amplitude of the magnetic field and output a gain control signal; a signal restoration unit configured to receive a carrier signal and a data signal that overlaps with the carrier signal via the antenna, and restore the data signal from the received signals; and a variable-gain amplifier configured to amplify the data signal restored by the signal restoration unit according to the gain control signal.

The signal restoration unit may include a mixer configured to mix the carrier signal with an oscillation signal; and a low-pass filter configured to low-pass filter an output signal of the mixer.

The oscillation signal may have a same frequency as the carrier signal.

The monitor may digitize the measured amplitude of the magnetic field to generate digit output code, and the gain controller may determine the amplification gain corresponding to the output code.

According to another example embodiment of the inventive concepts, a method of operating an NFC card reader for communicating with an NFC card includes measuring a voltage of a carrier signal received via an antenna; determining an amplification gain based on the measured voltage of the carrier signal; receiving the carrier signal and a data signal that overlaps with the carrier signal via the antenna, and restoring the data signal from the received signals; and amplifying the restored data signal according to the determined amplification gain.

The determining of the amplification gain may include determining a range of the measured voltage by comparing the measured voltage with at least one predetermined reference value; and determining the amplification gain predetermined to correspond to the range of the measured voltage.

According to another example embodiment of the inventive concepts, an NFC system includes an antenna; an NFC card reader configured to detect accessing of an NFC card and communicate with the NFC card; and a matching circuit connected between the NFC card reader and the antenna.

The NFC card reader may include a monitor configured to measure an amplitude of a magnetic field induced by the antenna; a gain controller configured to determine an amplification gain and output a gain control signal, based on the measured amplitude of the magnetic field; a signal restoration unit configured to receive a carrier signal and a data signal overlapping with the carrier signal via the antenna, and restore the data signal from the received signals; and a variable-gain amplifier configured to amplify the restored data signal by the signal restoration unit according to the gain control signal.

Some example embodiments relate to a communication device configured to variably amplify a data signal received from a card.

In some example embodiments, the communication device includes a card reader configured to, measure an amplitude of a magnetic field induced by the communication device when the communication device senses the card, determine the amplification gain to utilize during a subsequent transmission of the data signal from the card to the card reader based on the amplitude of the magnetic field, receive the data signal from the card, and amplify the data signal based on the amplification gain to generate an amplified data signal.

In some example embodiments, the card reader is configured to receive the data signal via a modulated signal, the modulated signal including the data signal and a carrier signal overlapping therewith, and restore the data signal from modulated signal by mixing the carrier signal with an oscillation signal to generate a mixed signal, and performing low-pass filtering on the mixed signal, the oscillation signal having a same frequency as the carrier signal.

In some example embodiments, the card reader is configured to determine the amplification gain by, digitizing, via an analog-to-digital converter (ADC), the amplitude of the magnetic field to generate a digital output code, and determining the amplification gain corresponding to the digital output code.

In some example embodiments, the card reader determines the amplification gain by determining which one of a plurality of amplification gains corresponds to the digital out code.

In some example embodiments, the card reader is configured to vary the amplification gain based on a distance between the card and the card reader as indicated by the amplitude of the magnetic field.

In some example embodiments, the card reader is configured to determine the amplification gain prior to receiving the data signal from the card.

BRIEF DESCRIPTION OF THE DRAWINGS

Exemplary embodiments of the inventive concepts will be more clearly understood from the following detailed description taken in conjunction with the accompanying drawings in which.

DETAILED DESCRIPTION

Figure 1:
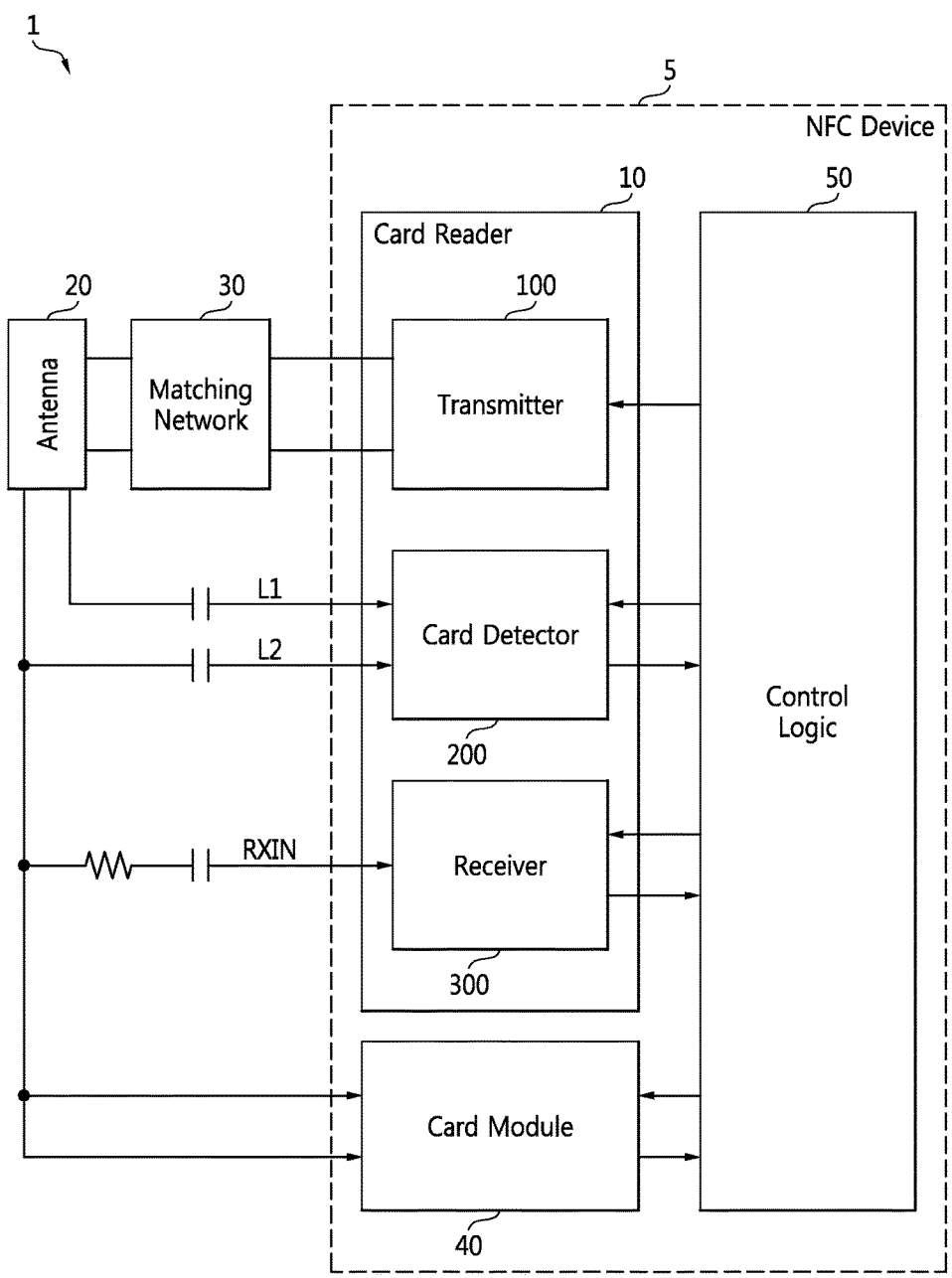
FIG. 1 is a block diagram of a non-contact type communication system according to an example embodiment of the inventive concepts.

Example embodiments of the inventive concepts now will be described more fully hereinafter with reference to the accompanying drawings, in which some example embodiments are shown. The inventive concepts may, however, be embodied in many different forms and should not be construed as limited to the example embodiments set forth herein. Rather, these example embodiments are provided so that this disclosure will be thorough and complete, and will fully convey the scope of the example embodiments to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As appreciated, devices and methods of forming devices according to various example embodiments described herein may be embodied in microelectronic devices such as integrated circuits, wherein a plurality of devices according to various example embodiments described herein are integrated in the same microelectronic device. Accordingly, the cross-sectional view(s) illustrated herein may be replicated in two different directions, which need not be orthogonal, in the microelectronic device. Thus, a plan view of the microelectronic device that embodies devices according to various example embodiments described herein may include a plurality of the devices in an array and/or in a two-dimensional pattern that is based on the functionality of the microelectronic device.

The devices according to various example embodiments described herein may be interspersed among other devices depending on the functionality of the microelectronic device. Moreover, microelectronic devices according to various example embodiments described herein may be replicated in a third direction that may be orthogonal to the two different directions, to provide three-dimensional integrated circuits.

Accordingly, the cross-sectional view(s) illustrated herein provide support for a plurality of devices according to various example embodiments described herein that extend along two different directions in a plan view and/or in three different directions in a perspective view. For example, when a single active region is illustrated in a cross-sectional view of a device/structure, the device/structure may include a plurality of active regions and transistor structures (or memory cell structures, gate structures, etc., as appropriate to the case) thereon, as would be illustrated by a plan view of the device/structure.

Example embodiments disclosed herein may include hardware configured to execute program code including program instructions, software components, software modules, data files, data structures, and/or the like. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors. The hardware devices may be configured as special purpose processing circuits and/or hardware devices to perform functions illustrated in one or more of the flow charts or sequence diagrams discussed herein.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

FIG. 1 is a block diagram of a non-contact type communication system 1 according to an example embodiment of the inventive concepts.

Referring to FIG. 1, the non-contact type communication system 1 includes a non-contact type communication apparatus 5, an antenna 20, and a matching circuit 30. The non-contact type communication system 1 may be a near-field communication (NFC) system but example embodiments are not limited thereto. NFC is a non-contact type communication technique that is one of radio-frequency identification (RFID) techniques and that uses a frequency band of 13.56 MHz.

The non-contact type communication apparatus 5 may include a card reader 10 and a control logic 50, and may be embodied as a chip or a package.

The card reader 10 detects whether the card reader 10 is accessed or contacted by a card, e.g., an NFC card (not shown), and communicates with the card to read information from the card when the accessing or contacting of the card is detected. The card reader 10 includes a transmitter 100, a card detector 200, and a receiver 300.

Here, examples of the NFC card may include various types of devices from which information may be read by the NFC card reader 10. For example, the NFC card may be a device that includes an NFC chip and a coil (e.g., an antenna), and may be embodied in various forms, e.g., a card type, a tag type, a sticker type, etc.

The card detector 200 detects whether the card reader 10 is accessed or contacted by a card.

The card reader 10 operates in a power-down state while no card is in contact with the card reader 10. When the card detector 200 detects accessing or contacting of a card, the card reader 10 wakes up. As described above, when accessing or contacting of a card is detected, the card reader 10 may communicate with the card to read information stored in the card.

The matching circuit 30 is a circuit connected between the non-contact type communication apparatus 5 and the antenna 20 to perform impedance matching between the non-contact type communication apparatus 5 and the antenna 20.

The antenna 20 may be embodied as a coil antenna but example embodiments are not limited thereto.

In one example embodiment, the non-contact type communication apparatus 5 may further include a card module 40. Although not shown, the card module 40 may include a processor and a memory. The card module 40 may store information in the memory and communicate with an external card reader device (not shown) via the antenna 20.

The control logic 50 controls operations of the card reader 10 and the card module 40.

The control logic 50 may include a processor and a memory (not shown).

The memory may contain computer readable code that, when executed by the processor, may transform the processor into a special purpose computer configured to instruct the card reader 10 variably amplify a data signal received from the card based on a distance between the card and the card reader 10. Therefore, the special purpose processor may improve the functioning of the non-contact type communication system 1 itself by amplifying the restored data signal AS to a level suitable for converting the restored data signal AS into a digital signal such that the data signal is not saturated.

The transmitter 100 supplies electric current to the antenna 20 so as to generate an induced voltage $V_{ANT}$ in the antenna 20. Thus, a magnetic field is generated near the antenna 20. The induced voltage $V_{ANT}$ generated in the antenna 20 may vary according to the characteristics of the matching circuit 30 and the antenna 20.

The card detector 200 determines whether the card reader 10 is accessed by a non-contact type card by detecting the induced voltage $V_{ANT}$ generated by the antenna 20, i.e., the amplitude of a magnetic field. For example, the card detector 200 may determine whether the card reader 10 is accessed by a card by detecting a change in the amplitude of the magnetic field that varies according to whether the card is present near the card reader 10 or not.

When the card detector 200 detects the presence of a card, the card detector 200 may send a signal to the control logic 50 indicating the presence of the card, for example, the card detector 200 may transmit a wake-up signal to the control logic 50. The control logic 50 may wake up the receiver 300 according to the wake-up signal received from the card detector 200.

The receiver 300 may communicate with the detected card to receive information from the card under control of the control logic 50.

Figure 2A:
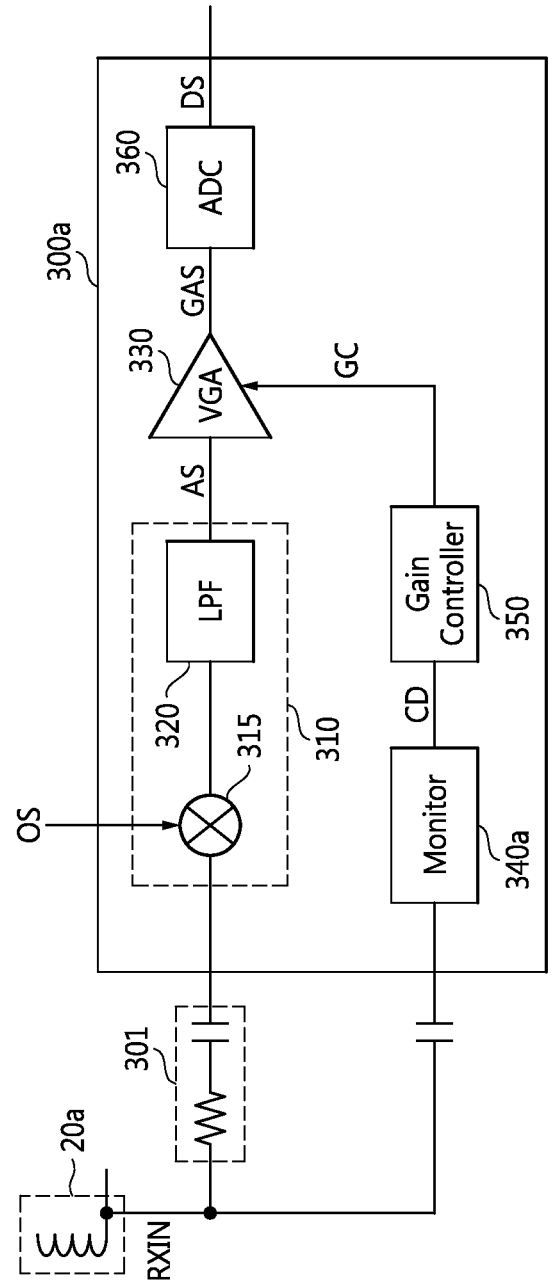
FIG. 2A is a schematic block diagram of a receiver of FIG. 1 according to an example embodiment of the inventive concepts.
Figure 2B:
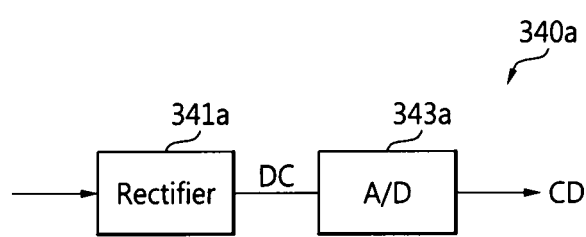
FIG. 2B is a block diagram of a monitor of FIG. 2A according to an example embodiment of the inventive concepts.

FIG. 2A is a schematic block diagram of a receiver 300a such as the receiver 300 of FIG. 1 according to an example embodiment of the inventive concept. FIG. 2B is a block diagram of a monitor 340a of FIG. 2A according to an example embodiment of the inventive concepts.

Referring to FIG. 2A, the receiver 300a according to an example embodiment of the inventive concepts may include a signal restoration unit 310, a variable-gain amplifier 330, the monitor 340a, and a gain controller 350.

The monitor 340a digitizes a level or amplitude of a magnetic field and may be included in the receiver 300a or the card detector 200 of FIG. 1.

The receiver 300a receives and demodulates a signal modulated by a card, and controls an amplification gain of the demodulated signal.

The monitor 340a may measure a level of a magnetic field induced by an antenna 20a, and digitize and output the measured level of the magnetic field. The gain controller 350 determines an appropriate amplification gain based on the digitized level of the magnetic field.

Referring to FIG. 2B, the monitor 340a according to an example embodiment of the inventive concepts may include a rectifier 341a and an analog-digital converter (ADC) 343a.

The rectifier 341a rectifies a carrier signal of a specific frequency (e.g., 13.56 MHz) received via the antenna 20a into a direct current (DC) signal. The rectifier 341a may include the circuitry illustrated in the rectifier 341b illustrated in FIG. 3. The ADC 343a digitizes the DC signal into a digital output code CD by converting the DC signal into a digital signal.

Thus, the monitor 340a may generate output code CD digitized according to the measured level of the magnetic field. The output code CD may be digital code including a plurality of bits (e.g., two or more bits). The gain controller 350 may determine a gain according to the output code CD of the monitor 340a, and output a gain control signal GC corresponding to the determined gain to the variable-gain amplifier 330.

The signal restoration unit 310 receives a signal modulated by a card from the antenna 20a and demodulates this signal. In one example embodiment, an attenuator 301 may be connected between the signal restoration unit 310 and the antenna 20a.

The signal restoration unit 310 may include a mixer 315 and a low-pass filter (LPF) 320. The mixer 315 mixes a signal RXIN received via the antenna 20a with an oscillation signal OS.

The received signal RXIN includes a carrier signal of a specific frequency (e.g., 13.56 MHz) and a data signal AS that overlaps with the carrier signal. The data signal AS is a signal component modulated by a card. Thus, the signal restoration unit 310 restores the data signal AS by removing the carrier signal from the received signal RXIN that includes the data signal overlapping with the carrier signal.

The oscillation signal OS has the same frequency as the carrier signal.

The LPF 320 restores the data signal AS by low-pass filtering an output signal of the mixer 315.

The variable-gain amplifier 330 amplifies the data signal AS output from the LPF 320 according to the gain control signal GC output from the gain controller 350. A gain of the variable-gain amplifier 330 is controlled according to the gain control signal GC. Thus, the variable-gain amplifier 330 may amplify the restored data signal AS to a level suitable for converting the restored data signal AS into a digital signal.

The receiver 300a may further include an ADC 360. The ADC 360 converts an output signal GAS which is an analog signal of the variable-gain amplifier 330 into a digital signal DS. The digital signal DS may be input to the control logic 50 of FIG. 1.

Figure 3:
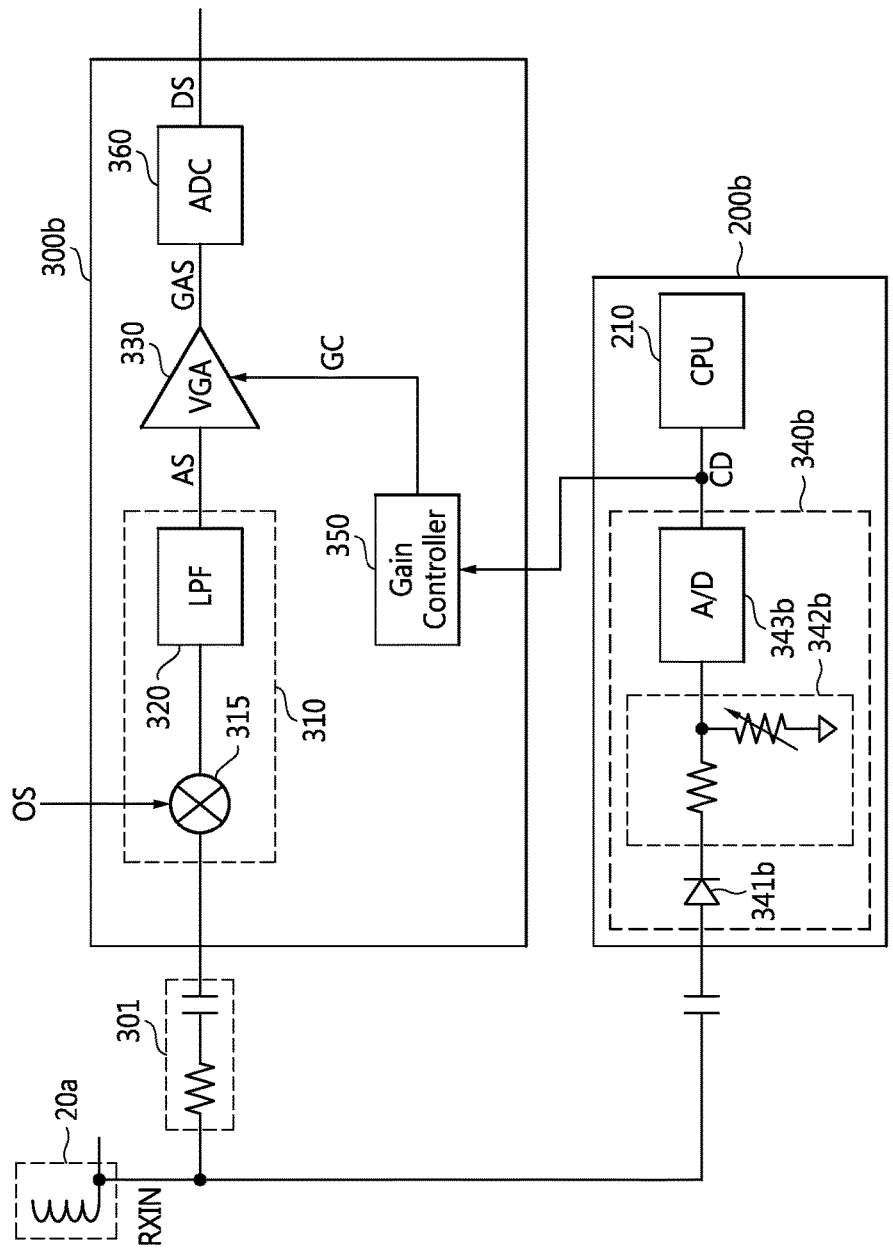
FIG. 3 is a schematic block diagram of a receiver and a card detector of FIG. 1 according to another example embodiment of the inventive concepts.

FIG. 3 is a schematic block diagram of a receiver 300b and a card detector 200b such as those of FIG. 1 according to another example embodiment of the inventive concepts.

Referring to FIG. 3, according to another example embodiment of the inventive concepts, the receiver 300b may include a signal restoration unit 310, a variable-gain amplifier 330, and a gain controller 350, and the card detector 200b may include a monitor 340b and a central processing unit (CPU) 210.

While the monitor 340a is included in the receiver 300a in the example embodiment of the FIG. 2, the monitor 340b is included in the card detector 200b in the example embodiment of FIG. 3.

The monitor 340b may include a rectifier 341b, an attenuator 342b, and an ADC 343b.

The rectifier 341b may be connected to an antenna 20a so as to rectify a carrier signal of a specific frequency (e.g., 13.56 MHz) received via an antenna 20a. The attenuator 342b may receive the rectified signal from the rectifier 341b, decrease a level of the rectified signal, and output an attenuation signal.

The ADC 343b may convert the attenuation signal into output code CD which is a digital signal and output the output code CD. The output code CD may be input to the gain controller 350 of the receiver 300b.

The gain controller 350 may determine a gain according to the output code CD of the monitor 340b, and output a gain control signal GC corresponding to the gain to the variable-gain amplifier 330.

The signal restoration unit 310, the variable-gain amplifier 330, and the gain controller 350 included in the receiver 300b are the same as those described above with reference to FIG. 2A.

In the embodiment of FIG. 3, the attenuator 342b is connected between the rectifier 341b and the ADC 343b. However, in another example embodiment, the attenuator 342b may be omitted or connected to a front end of the rectifier 341b, i.e., between the antenna 20a and the rectifier 341b.

As described above, the monitor 340b according to an example embodiment of the inventive concepts measures the amplitude of a magnetic field induced by the antenna 20a so as to control a variable gain of the receiver 300a or 300b.

Also, the monitor 340b measures the amplitude of a magnetic field to detect a card, i.e., contacting (or accessing) of a card.

The CPU 210 may determine whether a card reader (not shown) is contacted or accessed by a card, based on the output code CD output from the monitor 340b.

For example, the CPU 210 may determine whether the output code output from the monitor 340b is equal to or greater than a desired (or, alternatively, a predetermined) threshold, and determine that the card reader is contacted or accessed by a card when the output code is equal to or greater than the threshold.

Figure 4A:
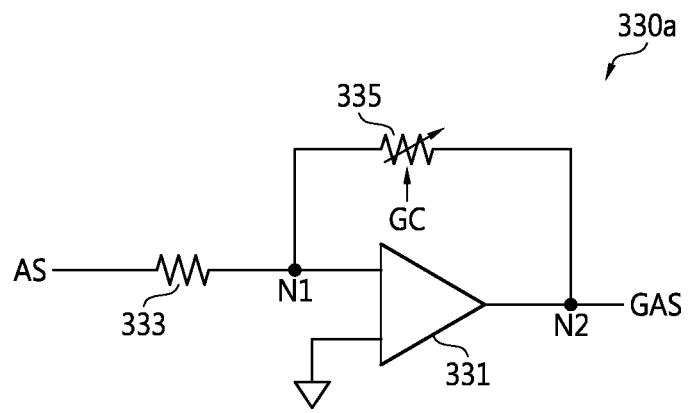
FIG. 4A is a circuit diagram of a variable-gain amplifier of FIG. 2A according to an example embodiment of the inventive concepts.

FIG. 4A is a circuit diagram of a variable-gain amplifier 330a such as that of FIG. 2A according to an example embodiment of the inventive concepts.

Referring to FIG. 4A, the variable-gain amplifier 330a includes an operational amplifier 331, a first resistor 333, and a second resistor 335.

The first resistor 333 may be connected to a first input node N1 of the operational amplifier 331, and the second resistor 335 may be connected between the first input node N1 of the operational amplifier 331 and an output node N2. A second input node of the operational amplifier 331 may be connected to the ground. At least one of the first and second resistors 333 and 335 may be a variable-resistance device, the resistance value of which varies according to a gain control signal GC.

In the embodiment of FIG. 4A, the second resistor 335 is embodied as a variable-resistance device, however, example embodiments are not limited thereto.

Figure 5:
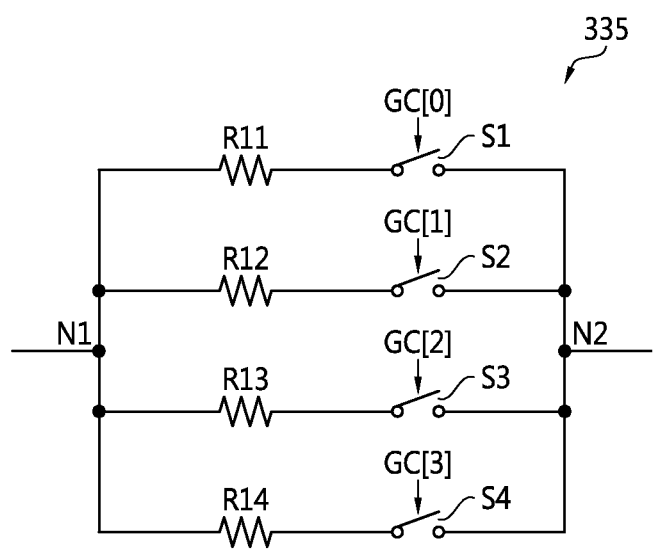
FIG. 5 is a circuit diagram of a second resistor of FIG. 3 according to an example embodiment of the inventive concepts.

The second resistor 335 according to an example embodiment of the inventive concepts is illustrated in FIG. 5.

Referring to FIG. 5, the second resistor 335 may include a plurality of resistors R11, R12, R13, and R14 and a plurality of switches S1, S2, S3, and S4. Each of the switches S1, S2, S3, and S4 is selectively opened or closed according to a corresponding bit of the gain control signal GC including a plurality of bits. As the switches S1, S2, S3, and S4 are selectively opened or closed, the number of resistors to be connected between the first input node N1 and the output node N2 may change. Thus, a resistance value of the second resistor 335 is variable.

Referring back to FIG. 4A, a resistance value of at least one of the first and second resistors 333 and 335 is variable according to the gain control signal GC. If it is assumed that the resistance values of the respective first and second resistors 333 and 335 are R1 and R2, the ratio between the resistance values R1 and R2 may change according to the gain control signal GC to change a gain of the variable-gain amplifier 330a.

Figure 4B:
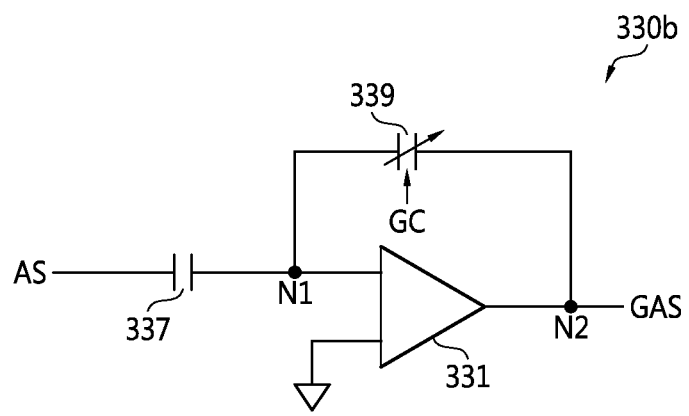
FIG. 4B is a circuit diagram of a variable-gain amplifier of FIG. 2A according to another example embodiment of the inventive concepts.

FIG. 4B is a circuit diagram of a variable-gain amplifier 330b such as that of FIG. 2A according to another example embodiment of the inventive concepts.

Referring to FIG. 4B, the variable-gain amplifier 330b includes an operational amplifier 331, a first capacitor 337, and a second capacitor 339.

The first capacitor 337 may be connected to a first input node N1 of the operational amplifier 331, and the second capacitor 339 may be connected between the first input node N1 of the operational amplifier 331 and an output node N2. A second input node N2 of the operational amplifier 331 may be connected to the ground.

At least one of the first and second capacitors 337 and 339 may be a variable capacitor, the capacitance of which is variable according to a gain control signal GC.

Although the second capacitor 339 is embodied as a variable capacitor in the embodiment of FIG. 4B, example embodiments of the inventive concepts are not limited thereto.

The structure of the second capacitor 339 which is a variable capacitor may be substantially the same as that of the second resistor 335 which is a variable resistor of FIG. 5 except that a plurality of capacitors are used instead of the plurality of resistors R11, R12, R13, and R14.

In the embodiment of FIG. 4B, the ratio between the capacitances of the first and second capacitors 337 and 339 varies according to the gain control signal GC to change a gain of the variable-gain amplifier 330b.

Figure 6A:
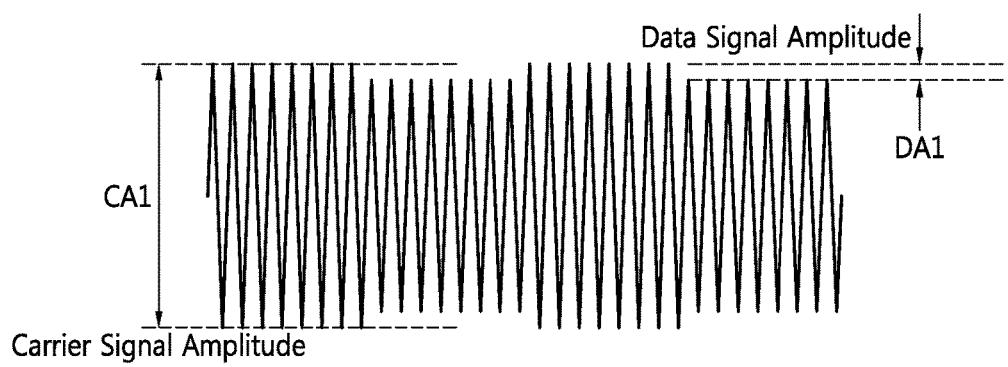
FIGS. 6A and 6B are schematic waveform diagrams illustrating the relationships between a level of a magnetic field induced by an antenna and a level of a data signal overlapping with the magnetic field when the distance between a card and a card reader is large and when the distance between a card and a card reader is small, respectively.
Figure 6B:
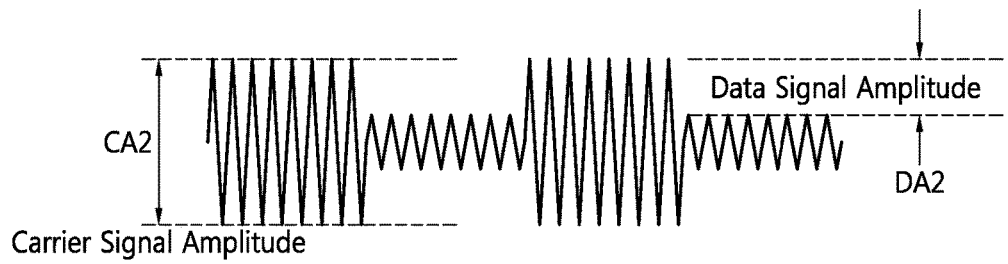

FIGS. 6A and 6B are schematic waveform diagrams illustrating the relationships between a level of a magnetic field (or a carrier signal) induced by an antenna and a level of a data signal overlapping with the magnetic field when the distance between a card and a card reader is large and when the distance between a card and a card reader is small, respectively.

Referring to FIGS. 6A and 6B, the relationship between the level of the magnetic field (the carrier signal) induced by the antenna and the level of the overlapping data signal is that the level of the magnetic field increases and the level of the overlapping data signal decreases when the distance between the card and the card reader is large (see FIG. 6A) and the level of the magnetic field decreases and the amplitude of the overlapping data signal increases when the distance between the card and the card reader is small (see FIG. 6B).

That is, an amplitude CA1 of the carrier signal when the distance between the card and the card reader is large (see FIG. 6A) is greater than an amplitude CA2 of the carrier signal when the distance between the card and the card reader is small (see FIG. 6B). An amplitude DA1 of the data signal when the distance between the card and the card reader is large (see FIG. 6A) is less than an amplitude DA2 of the data signal when the distance between the card and the card reader is small (see FIG. 6B).

Thus, the monitor 340 and the gain controller 350 may digitize the amplitude of the magnetic field based on the relationship between a change in the amplitude of the magnetic field and a change in the amplitude of the data signal according to the distance between the card and the card reader, and set at least one reference value to be less than or equal to a level at which the product of the amplitude of a corresponding signal and a default gain is determined to saturate.

If the amplitude of the magnetic field measured by the monitor 340 decreases to be less than a first reference value and the data signal is expected to saturate, the gain controller 350 changes a gain of the variable-gain amplifier 330 to prevent the product of the amplitude of the data signal and the gain from being saturated.

Even if the amplitude of the magnetic field measured by the monitor 340 increases to a second reference value or more and the amplitude of the data signal is thus expected to be significantly low, the gain controller 350 may change the gain of the variable-gain amplifier 330 to amplify the data signal to a level sufficient to convert the data signal into a digital signal.

Figure 7:
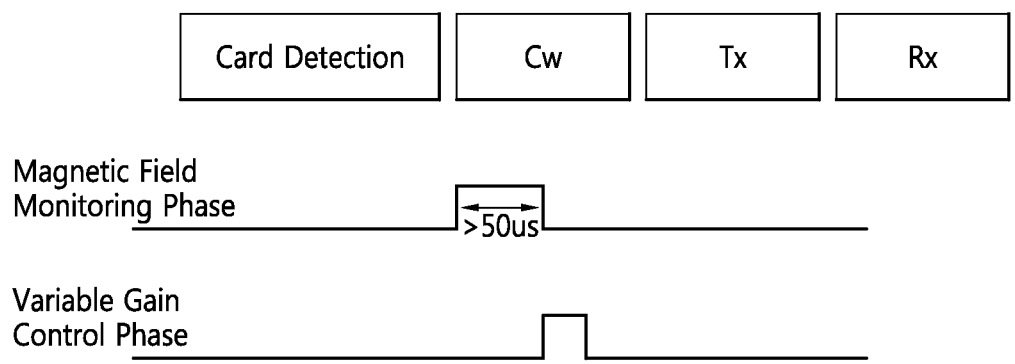
FIG. 7 is a schematic timing diagram of operations of a non-contact type communication system according to an example embodiment of the inventive concepts.

FIG. 7 is a schematic timing diagram of operations of a non-contact type communication system according to an example embodiment of the inventive concepts.

Referring to FIGS. 1 and 7, operational periods of the non-contact type communication apparatus may be largely divided into a card detection period in which whether the card reader 10 is contacted by a card is determined, a continuous wave period Cw in which a magnetic field is continuously radiated to calculate the distance between the card and the card reader 10, a transmission period Tx, and a receiving period Rx.

In the card detection period, in order to reduce power consumption in the non-contact type communication system 1, the card reader 10 may be in a power-down state or an idle state before a card is detected.

In the card detection period, while the card reader 10 is in the power-down state, the card reader 10 forms a short pulse type magnetic field by supplying induced current by the antenna 20 for a short time at predetermined time intervals (e.g., 0.2 to 1 s). If a card accesses within a desired (or, alternatively, a predetermined) distance from the card reader 10, the level of the magnetic field is decreased by the antenna 20 to be lower than when the card reader 10 is not accessed by the card. The card detector 200 of the card reader 10 may sense the change in the level of the magnetic field to determine whether the card reader 10 is accessed (or contacted) by the card.

Then, in the continuous wave period Cw, the non-contact type communication system 1 may radiate a magnetic field by continuously generating a carrier signal for a desired (or, alternatively, a predetermined) time or more.

The non-contact type communication system 1 measures the level of the magnetic field in the continuous wave period Cw. In an example embodiment of the inventive concepts, the monitor 340 may measure and digitize the amplitude of the magnetic field for a desired (or, alternatively, a predetermined) measurement period of the continuous wave period Cw (e.g., about 50 μs after it is determined that the card reader 10 is contacted by a card).

The monitor 340 outputs either the amplitude of the magnetic field or code obtained by digitizing the amplitude of the magnetic field to the gain controller 350. The gain controller 350 determines a gain based on the amplitude of the magnetic field measured by the monitor 340.

The gain controller 350 outputs a gain control signal GC to the variable-gain amplifier 330, based on the determined gain. Thus, a gain of the variable-gain amplifier 330 is controlled before the receiving period Rx.

In the transmission period Tx, the non-contact type communication system 1 transmits data to the card.

In the receiving period Rx, the non-contact type communication system 1 receives data from the card. That is, a data signal modulated by the card overlaps with a carrier signal and is then received via the antenna 20. Thus, the signal restoration unit 310 of the non-contact type communication system 1 restores the data signal by removing the carrier signal from a signal in which the carrier signal and the data signal overlap with each other, and amplifies the restored signal. In this case, the gain of the variable-gain amplifier 330 is determined by the gain controller 350.

Accordingly, in an example embodiment of the inventive concepts, the gain of the variable-gain amplifier 330 is controlled based on the amplitude of the magnetic field before the receiving period Rx. That is, an amplification gain is adjusted to a level sufficient to convert a signal of the card into a digital signal before receiving of a signal begins in the receiving period Rx.

Conventionally, an initial communication failure may occur in a receiving period Rx when a gain is not controlled according to the level of the magnetic field before the receiving period Rx. In contrast, according to an example embodiment of the inventive concepts, the amplitude of a magnetic field induced by the antenna is measured and the gain of the variable-gain amplifier 330 is controlled based on the amplitude of the magnetic field, thereby reducing a probability that an initial communication failure will occur in the receiving period Rx.

The continuous wave period Cw is present between the card detection period and the transmission period Tx in the embodiment of FIG. 7, but may be present between the transmission period Tx and the receiving period Rx in other example embodiments of the inventive concepts.

As described above, according to an example embodiment of the inventive concepts, after it is determined that the card reader 10 is contacted by a card (i.e., the card is detected), an amplification gain of the receiver 300 is controlled by measuring the level of a magnetic field, before data is received from the card, thereby increasing a data receiving rate.

Figure 8:
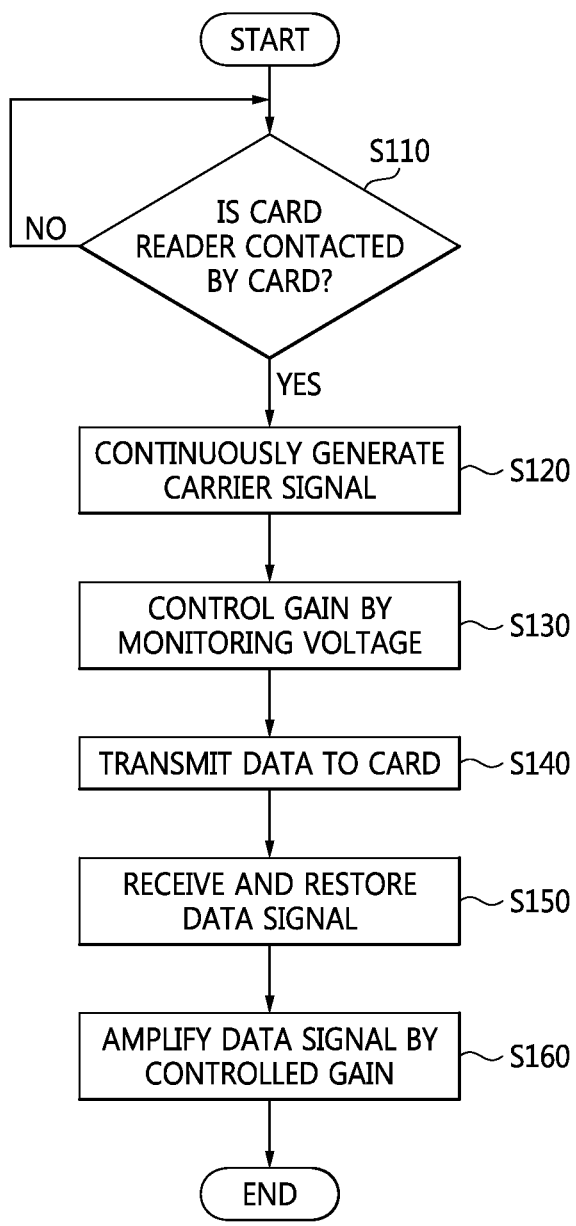
FIG. 8 is a flowchart of a method of operating a non-contact type communication system according to an example embodiment of the inventive concepts.

FIG. 8 is a flowchart of a method of operating a non-contact type communication system according to an example embodiment of the inventive concepts. The method of FIG. 8 may be performed by the non-contact type communication system 1 of FIG. 1.

Referring to FIG. 8, in the non-contact type communication system 1, in operation S110, the card detector 200 determines whether the card reader 10 is contacted (accessed) by a card.

In operation S120, when the card detector 200 detects the contacting (accessing) of the card, the transmitter 100 of the non-contact type communication system 1 continuously generates a carrier signal (a magnetic field).

In operation S130, in at least a part of the period in which the carrier signal (the magnetic field) is continuously generated, the receiver 300 may measure the amplitude of a magnetic field induced by the antenna 20 and control a gain of the variable-gain amplifier 330 based on the measured amplitude. Details on operation S130 are discussed below with reference to FIGS. 9 and 10.

Although FIG. 8 illustrates that operation S130 is performed after operation S120, operation S130 may be performed while operation S120 is performed.

In operation S140, the transmitter 100 transmits data to the card.

In operation S150, the receiver 300 receives and restores a data signal overlapping with the carrier signal.

In operation 5160, the variable-gain amplifier 330 of the receiver 300 amplifies the restored data signal by the gain controlled in operation S130.

Optionally, the ADC 360 of the receiver 300 may convert resultant restored data signal GAS amplified by the variable-gain amplifier 330 into a digital signal DS, and the digital signal DS may be input to the control logic 50 to be stored or to be additionally processed.

Figure 9:
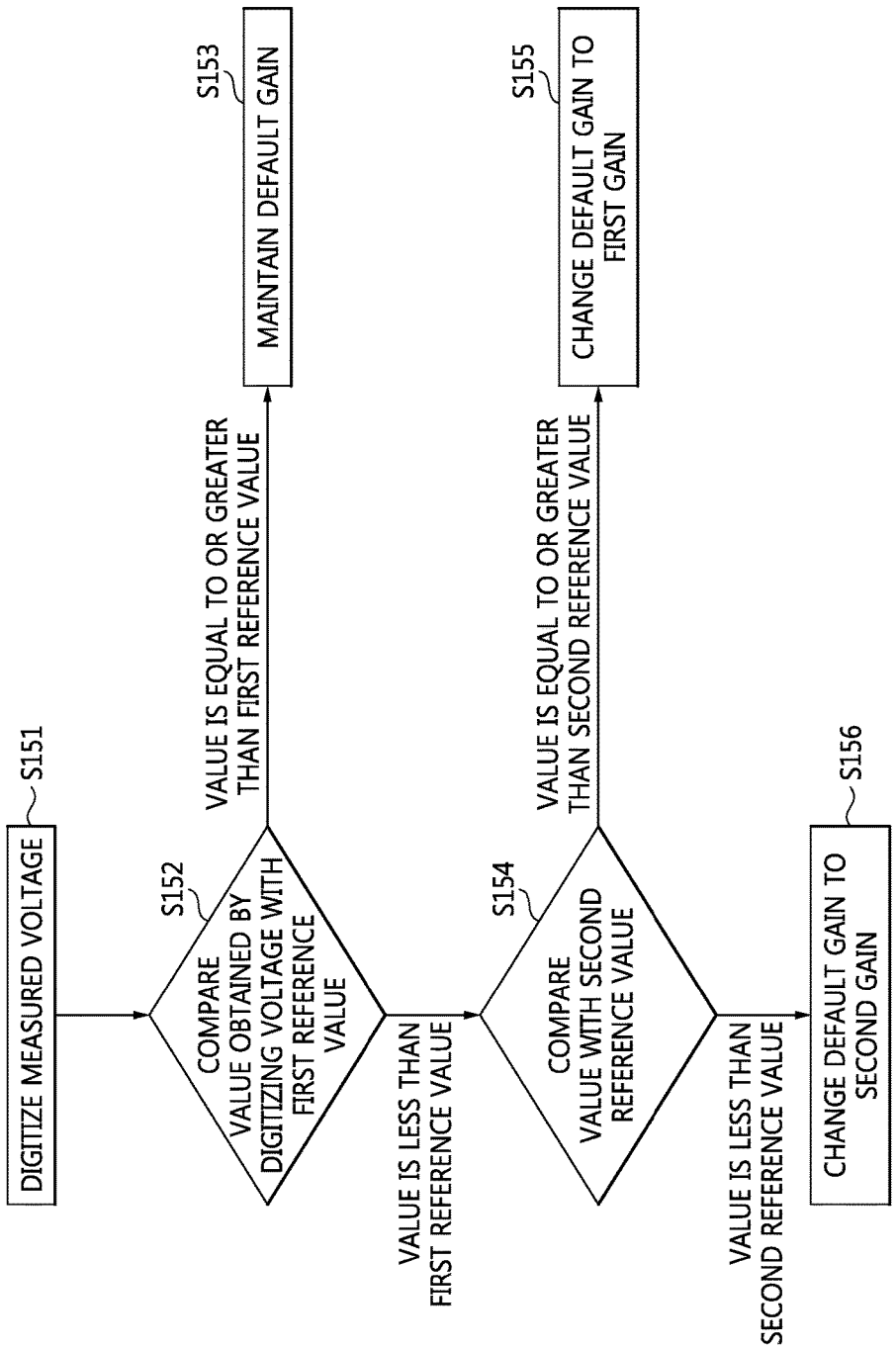
FIG. 9 is a flowchart of a gain control method according to an example embodiment of the inventive concepts.

FIG. 9 is a flowchart of a gain control method according to an example embodiment of the inventive concepts.

Referring to FIG. 9, in operation 5151, the amplitude of a magnetic field induced by an antenna, i.e., a voltage, is measured and digitized.

In operation 5152, a value obtained by digitizing the magnetic field is compared with a first reference value.

In operation 5153, a default gain is maintained when the value is equal to or greater than the first reference value.

In operation 5154, when the value is less than the first reference value, the value is compared with a second reference value.

In operation 5155, when a result of comparing the value with the second reference value in operation 5154 reveals that the value is equal to or greater than the second reference value, the default gain is changed to a first gain.

In operation 5156, when the value is less than the second reference value, the default gain is changed to a second gain.

Figures 10, 11:
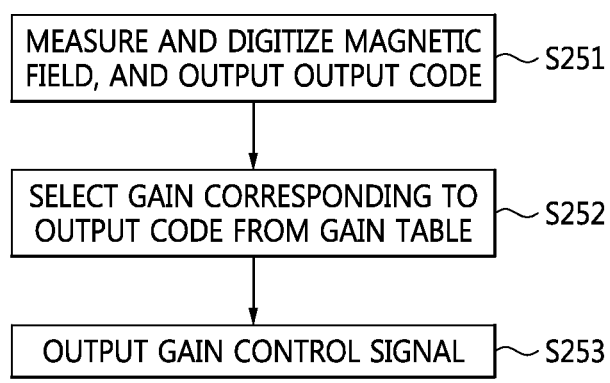
FIG. 10 is a flowchart of a gain control method according to another example embodiment of the inventive concepts.
FIG. 11 is a gain table according to an example embodiment of the inventive concepts.

FIG. 10 is a flowchart of a gain control method according to another example embodiment of the inventive concepts. FIG. 11 is a gain table according to an example embodiment of the inventive concepts.

Referring to FIGS. 10 and 11, in operation S251, a magnetic field induced by an antenna, i.e., a voltage, is measured, and digitized and output as output code CD.

In operation S252, a gain corresponding to the output code CD is selected from a gain table, the gain table may include desired (or, alternatively, predetermined values).

The output code CD may be a 2-bit digital signal, e.g., '00', '01', '10', or '11', as illustrated in FIG. 11 but is not limited thereto. In the gain table, for example, gains 'G10', 'G11', G12' and 'G13' are stored to correspond to '00', '01', '10' and '11' which are output codes CD, respectively.

In operation S253, a gain control signal for controlling the variable-gain amplifier 330 according to a selected gain is output.

Figure 12:
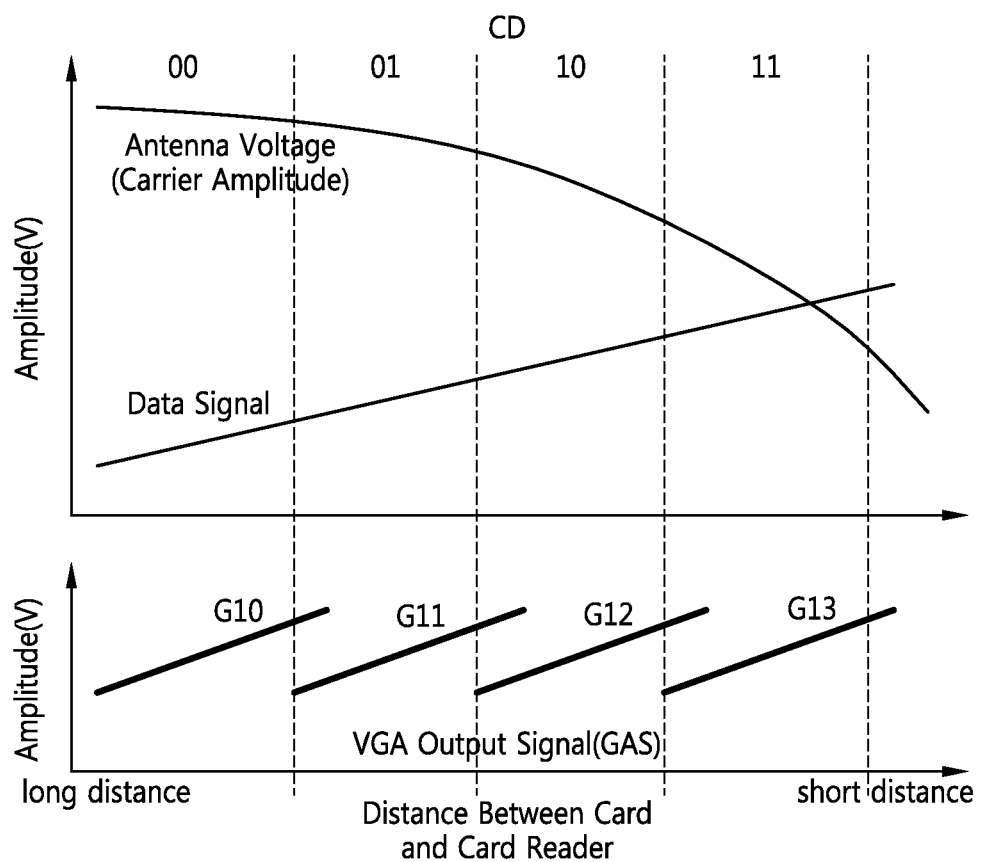
FIG. 12 is a graph illustrating the relationship among a voltage of an antenna, an amplitude of a data signal, output code of a monitor, and a gain according to the distance between a card and a card reader.

FIG. 12 is a graph illustrating the relationship among a voltage of an antenna, an amplitude of a data signal, output code of a monitor, and a gain according to the distance between a card and a card reader.

Referring to FIG. 12, an antenna voltage, i.e., the amplitude of a carrier signal, decreases and a data signal that overlaps with the carrier signal increases, as the distance between a card and a card reader decreases.

Measured antenna voltages may be classified into four ranges, and thus, output codes CD may be '00', 01', '10', and 11'.

A default gain G10 may be selected when output code CD is '00', a first gain G11 may be selected when output code is '01', a second gain G12 may be selected when output code is '10', and a third gain G13 may be selected when output code is '11'.

As described above, according to an example embodiment of the inventive concepts, the amplitude of a magnetic field induced by the antenna 20 of the card reader 10 is monitored to predict the amplitude of a signal to overlap with the magnetic field, and an amplification gain of the variable-gain amplifier 330 of the receiver 300 is changed based on the predicted amplitude. The amplitude of the magnetic field induced by the antenna 200 may be digitized by the monitor 340, and is adjusted by a desired (or, alternatively, a predetermined) amplification gain by the gain controller 350 based on data obtained by digitizing the amplitude of the magnetic field. Thus, the variable-gain amplifier 330 controls an amplification gain of the receiver 300 based on the adjusted amplitude of the magnetic field. A process of controlling the amplification gain is completed before a receiving operation of the card reader 10 is performed, and thus the performance of communication may be effectively improved without additionally causing errors.

Figure 13:
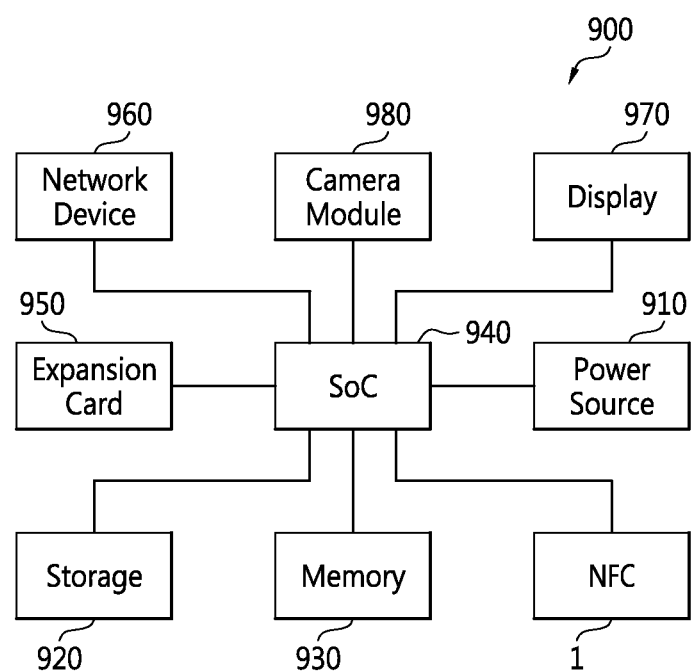
FIG. 13 is a block diagram of an electronic system to some example embodiment of the inventive concepts.

FIG. 13 is a block diagram of an electronic system 900 according to some example embodiments of the inventive concepts.

Referring to FIG. 13, the electronic system 900 may be implemented as a PC, a data server, a laptop computer or a portable device. The portable device may be a cellular phone, a smart phone, a tablet personal computer (PC), a personal digital assistant (PDA), an enterprise digital assistant (EDA), a digital still camera, a digital video camera, a portable multimedia player (PMP), portable navigation device (PDN), a handheld game console, or an e (electronic)-book device.

The electronic system 900 includes the non-contact type communication system (NFC) 1, a power source 910, a storage device 920, a memory 930, a SoC 940, an expansion card 950, a network device 960, a display 970 and a camera module 980. The electronic system 900 may further include I/O ports (not shown). According to some example embodiments, the non-contact type communication system 1 is a near-field communication (NFC) system but is not limited thereto.

The non-contact type communication system 1 may include a non-contact type communication apparatus (5 in FIG. 1), an antenna (20 in FIG. 1), and a matching circuit (30 in FIG. 1).

The non-contact type communication apparatus detects whether the card reader 10 is accessed or contacted by a card and communicates with the card. The matching circuit 30 is connected between the non-contact type communication apparatus and the antenna.

According to some example embodiments, the non-contact type communication apparatus (5 in FIG. 1) may be implemented as a single chip or a single package, and the antenna and the matching circuit may be implemented outside of the chip or the package.

For example, in case that the electronic system 900 uses a battery, the antenna may be implemented by forming a coil on the outside of the region in which the battery is mounted.

The SoC 940 may control the operation of at least one of the elements 1 and 910 through 980. The power source 910 may supply an operating voltage to at least one of the elements 1, and 920 through 980. The storage device 920 stores a program or data, and may be implemented by a hard disk drive (HDD) or a solid state drive (SSD).

The memory 930 may be implemented by a volatile or non-volatile memory. A memory controller (not shown) that controls a data access operation, e.g., a read operation, a write operation (or a program operation), or an erase operation, on the memory 930 may be integrated into or embedded in the SoC 940. Alternatively, the memory controller may be provided between the SoC 940 and the memory 930.

The I/O ports (not shown) are ports that receive data transmitted to the electronic system 900 or transmit data from the electronic system 900 to an external device. For instance, the I/O ports may include a port connecting with a pointing device such as a computer mouse, a port connecting with a printer, and a port connecting with a USB drive.

The expansion card 950 may be implemented as a secure digital (SD) card or a multimedia card (MMC). The expansion card 950 may be a subscriber identity module (SIM) card or a universal SIM (USIM) card.

The network device 960 enables the electronic system 900 to be connected with a wired or wireless network. The display 970 displays data output from the storage device 920, the memory 930, the I/O ports 940, the expansion card 950, or the network device 960.

The camera module 980 converts optical images into electrical images. Accordingly, the electrical images output from the camera module 980 may be stored in the storage module 920, the memory 930, or the expansion card 950. Also, the electrical images output from the camera module 980 may be displayed through the display 970.

According to an embodiment of the inventive concept, an amplification gain of a receiver is controlled based on the amplitude of a magnetic field induced by an antenna, i.e., a voltage of the antenna, thereby lowering a probability that communication to be established with a card will fail.

In particular, an amplification gain of a receiver may be controlled beforehand by predicting the amplitude of an overlapping data signal by measuring a voltage induced by an antenna of a non-contact type communication apparatus, thereby greatly reducing a probability that initial communication to be established with a card will fail.

While example embodiments of the inventive concepts have been particularly shown and described with reference to some example embodiments thereof, it will be understood that various changes in form and details may be made therein without departing from the spirit and scope of the following claims.

What is claimed is:

1. A near-field communication (NFC) card reader configured to communicate with an NFC card, the NFC card reader comprising:
    a receiver connected to an antenna via at least two discrete communication paths between the receiver and the antenna, the at least two discrete communication paths including a first communication path and a second communication path, the receiver including,
        a monitoring circuit connected to the antenna via the first communication path, the monitoring circuit configured to measure an amplitude of an antenna voltage of the antenna based on a first received signal received via the first communication path, the monitoring circuit connected with the antenna such that the antenna voltage does not pass through any mixer, the monitoring circuit including a rectifier configured to rectify the first received signal received from the NFC card via the first communication path to generate a rectified signal, and an analog-digital converter (ADC) configured to convert the rectified signal into a digital output code which is a digital signal;
        a gain controller configured to determine an amplification gain based on the measured amplitude of the antenna voltage determined from the first received signal received via the first communication path, and to output a gain control signal based on the amplification gain;
        a signal restoration circuit connected to the antenna via the second communication path, the signal restoration circuit configured to,
            receive, via the second communication path to the antenna, a second received signal from the NFC card, the second received signal including a carrier signal and a data signal that overlaps with the carrier signal, and
            restore the data signal from the second received signal; and
        a variable-gain amplifier configured to amplify the restored data signal according to the gain control signal.

2. The NFC card reader of claim 1, wherein the signal restoration circuit comprises:
    a mixer configured to mix the carrier signal with an oscillation signal to generate a mixed signal; and
    a low-pass filter configured to low-pass filter the mixed signal, wherein
        the oscillation signal has a same frequency as the carrier signal.

3. The NFC card reader of claim 1, wherein the gain controller is configured to determine the amplification gain by determining which one of a plurality of amplification gains stored in a gain table corresponds to the digital output code.

4. The NFC card reader of claim 1, wherein the gain controller is configured to determine the amplification gain based on the digital output code and at least one reference value.

5. The NFC card reader of claim 1, wherein the NFC card reader is configured to,
    determine, during a card detection period, whether the NFC card reader is contacted by the NFC card;
    continuously radiate, during a continuous wave period, a magnetic field for a period of time after the NFC card reader determines that the NFC card reader is contacted by the NFC card;
    measure, in at least a part of the continuous wave period, an amplitude of the magnetic field;
    transmit, during a transmission period, output data to the NFC card; and
    receive, during a receiving period, input data from the NFC card, wherein
        the amplification gain of the input data is determined based on the amplitude of the magnetic field measured during at least part of the continuous wave period.

6. The NFC card reader of claim 5, wherein
    the NFC card reader is configured to determine whether the NFC card reader is contacted by the NFC card by measuring the amplitude of the magnetic field during the card detection period, and
    the NFC card reader is configured to determine a gain of the variable-gain amplifier based on the amplitude of the magnetic field measured in the continuous wave period.

7. The NFC card reader of claim 1, wherein the variable-gain amplifier comprises:
    an operational amplifier;
    a first resistor connected to a first input node of the operational amplifier; and
    a second resistor connected between the first input node and an output node of the operational amplifier, wherein
        at least one of the first and second resistors has a variable resistance value that varies according to the gain control signal.

8. The NFC card reader of claim 1, wherein the variable-gain amplifier comprises:
    an operational amplifier;
    a first capacitor connected to a first input node of the operational amplifier; and
    a second capacitor connected between the first input node and an output node of the operational amplifier, wherein
        at least one of the first and second capacitors has a capacitance value that varies according to the gain control signal.

9. A method of operating a near-field communication (NFC) card reader, the NFC card reader configured to communicate with an NFC card the NFC card reader including a receiver connected to an antenna via at least two discrete communication paths between the receiver and the antenna, the at least two discrete communication paths including a first communication path and a second communication path, the method comprising:

measuring a voltage of a carrier signal received via the antenna using a monitoring circuit, the monitoring circuit connected with the antenna via the first communication path such that the carrier signal does not pass through any mixer, the monitoring circuit including a rectifier configured to rectify the carrier signal received from the NFC card via the antenna to generate a rectified signal, and an analog-digital converter (ADC) configured to convert the rectified signal into a digital output code which is a digital signal;

determining an amplification gain of a data signal based on the voltage of the carrier signal received via the first communication path;

receiving, via the second communication path to the antenna, a received signal including the carrier signal and the data signal, the data signal overlapping with the carrier signal;

restoring the data signal from the received signal; and amplifying the restored data signal based on the amplification gain.

10. The method of claim 9, wherein the determining the amplification gain comprises:

determining a range of the voltage of the carrier signal based on the voltage of the carrier signal and at least one reference value; and selecting the amplification gain based on the range of the voltage.

11. The method of claim 10, wherein the selecting the amplification gain selects the amplification gain by, determining which one of a plurality of amplification gains stored in a gain table corresponds to the digital output code.

12. The method of claim 9, further comprising:

determining, during a card detection period, whether the NFC card reader is contacted by the NFC card;

radiating, during a continuous wave period, a magnetic field by continuously generating the carrier signal for a period of time after the NFC card reader is contacted by the NFC card;

transmitting, during a transmission period, output data to the NFC card; and receiving, during a receiving period, input data from the NFC card.

13. The method of claim 12, wherein the measuring the voltage of the carrier signal and the determining the amplification gain are performed during the continuous wave period, and the restoring the data signal and the amplifying the restored data signal are performed during the receiving period.

14. The method of claim 12, further comprising:

generating, during the card detection period, a magnetic field by the antenna at set time intervals to determine whether the NFC card reader is contacted by the NFC card, and wherein the measuring the voltage of the carrier signal includes continuously generating, during the continuous wave period, the magnetic field by the antenna for the period of time.

15. A near field communication (NFC) system comprising:

an antenna;

an NFC card reader configured to detect accessing of an NFC card, and to communicate with the NFC card, the NFC card reader including a receiver connected to an antenna via at least two discrete communication paths between the receiver and the antenna, the at least two discrete communication paths including a first communication path and a second communication path, the receiver including, a monitoring circuit connected to the antenna via the first communication path, the monitoring circuit configured to measure an amplitude of an antenna voltage of the antenna based on a first received signal received via the first communication path, the monitoring circuit connected with the antenna such that the antenna voltage does not pass through any mixer, the monitoring circuit including a rectifier configured to rectify the first received signal received from the NFC card via the first communication path to generate a rectified signal, and an analog-digital converter (ADC) configured to convert the rectified signal into a digital output code which is a digital signal;

a gain controller configured to determine an amplification gain based on the amplitude of the antenna voltage determined from the first received signal received via the first communication path, and to output a gain control signal based on the amplification gain;

a signal restoration circuit connected to the antenna via the second communication path, the signal restoration circuit configured to, receive, via the second communication path to the antenna, a second received signal from the NFC card, the second received signal including a carrier signal and a data signal overlapping the carrier signal, and restore the data signal from the second received signal; and a variable-gain amplifier configured to amplify the restored data signal according to the gain control signal.

16. The NFC system of claim 15, wherein the NFC card reader is configured to, determine, during a card detection period, whether the NFC card reader is contacted by the NFC card;

continuously radiate, during a continuous wave period, a magnetic field for a period of time after the NFC card reader is contacted by the NFC card;

transmit, during a transmission period, output data to the NFC card; and receive, during a receiving period, input data from the NFC card, wherein the gain controller is configured to determine the amplification gain based on an amplitude of the magnetic field measured during at least a part of the continuous wave period.

17. The NFC system of claim 16, wherein, the NFC card reader is configured to, generate, during the card detection period, the magnetic field by the antenna at set time intervals to determine whether the NFC card reader is contacted by the NFC card, continuously generate, in the continuous wave period, the magnetic field by the antenna for the period of time, and determine a gain of the variable-gain amplifier based on the amplitude of the magnetic field measured by the monitoring circuit in the continuous wave period.

* * * * *